(12) United States Patent
Higo

(10) Patent No.: US 6,462,501 B1
(45) Date of Patent: Oct. 8, 2002

(54) MOTOR CONTROLLING METHOD AND APPARATUS

(75) Inventor: Akira Higo, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 36 days.

(21) Appl. No.: 09/662,797

(22) Filed: Sep. 15, 2000

(30) Foreign Application Priority Data

Sep. 16, 1999 (JP) .......................................... 11-262542

(51) Int. Cl.$^7$ ............................................ G05D 13/00
(52) U.S. Cl. ................................. 318/651; 318/568.18
(58) Field of Search ........................... 318/651, 568.18, 318/276–277

(56) References Cited

U.S. PATENT DOCUMENTS

| | | | | |
|---|---|---|---|---|
| 4,796,112 A | * | 1/1989 | Mizukami et al. | |
| 5,436,438 A | * | 7/1995 | Shikichi | |
| 5,604,720 A | * | 2/1997 | Kimura et al. | |
| 6,029,010 A | * | 2/2000 | Miyanari | .............. 318/603 X |
| 6,153,997 A | * | 11/2000 | Kobayashi et al. | .......... 318/560 |
| 6,222,798 B1 | * | 4/2001 | Kimura et al. | |

FOREIGN PATENT DOCUMENTS

JP 2810934 8/1998

* cited by examiner

*Primary Examiner*—Jeffrey Donels
(74) *Attorney, Agent, or Firm*—Birch, Stewart, Kolasch & Birch, LLP

(57) ABSTRACT

When a movement destination P is designated, a switching time $t_1$ when the movement is switched from acceleration to constant-speed-movement and a switching time $t_2$ when the movement is switched from the constant-speed-movement to deceleration are determined with respect to a designated time $T_0$. Then, a constant-speed-movement start position A and a deceleration start position B are set. Next, the constant speed (inclination of a straight line AB) during the constant-speed-movement period is found. An operation equation of the acceleration period is determined with an exponential function so that the panhead is smoothly shifted from the acceleration to the constant-speed-movement. In like manner, an operation equation of the deceleration period is determined with an exponential function so that the panhead is smoothly shifted from the constant-speed-movement to the deceleration.

3 Claims, 5 Drawing Sheets

F I G. 1
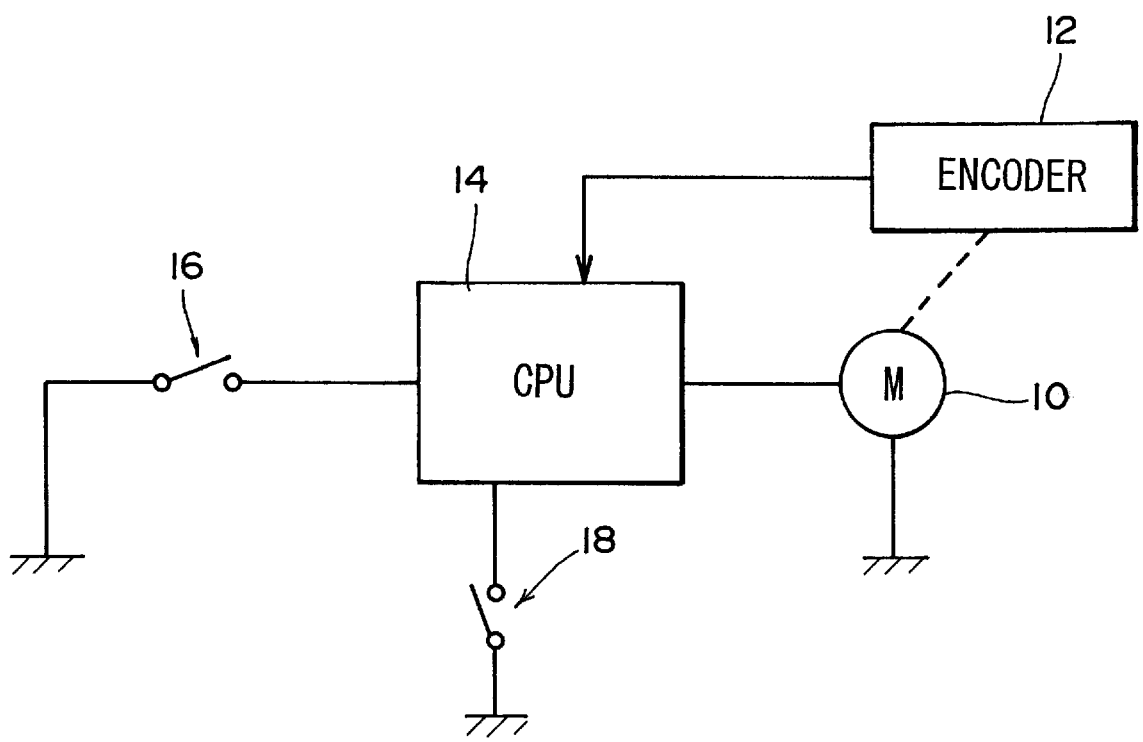

F I G. 2
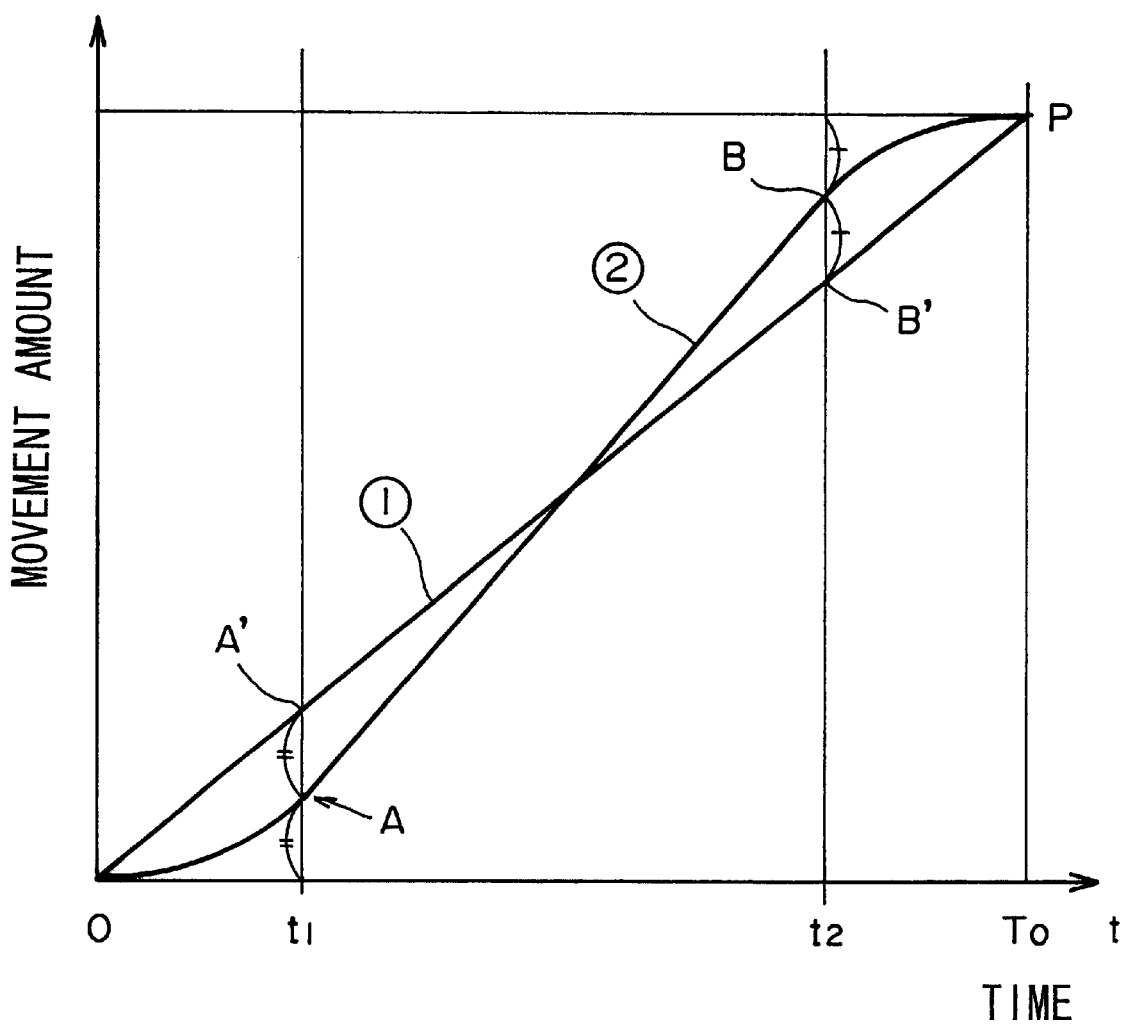

F I G. 3
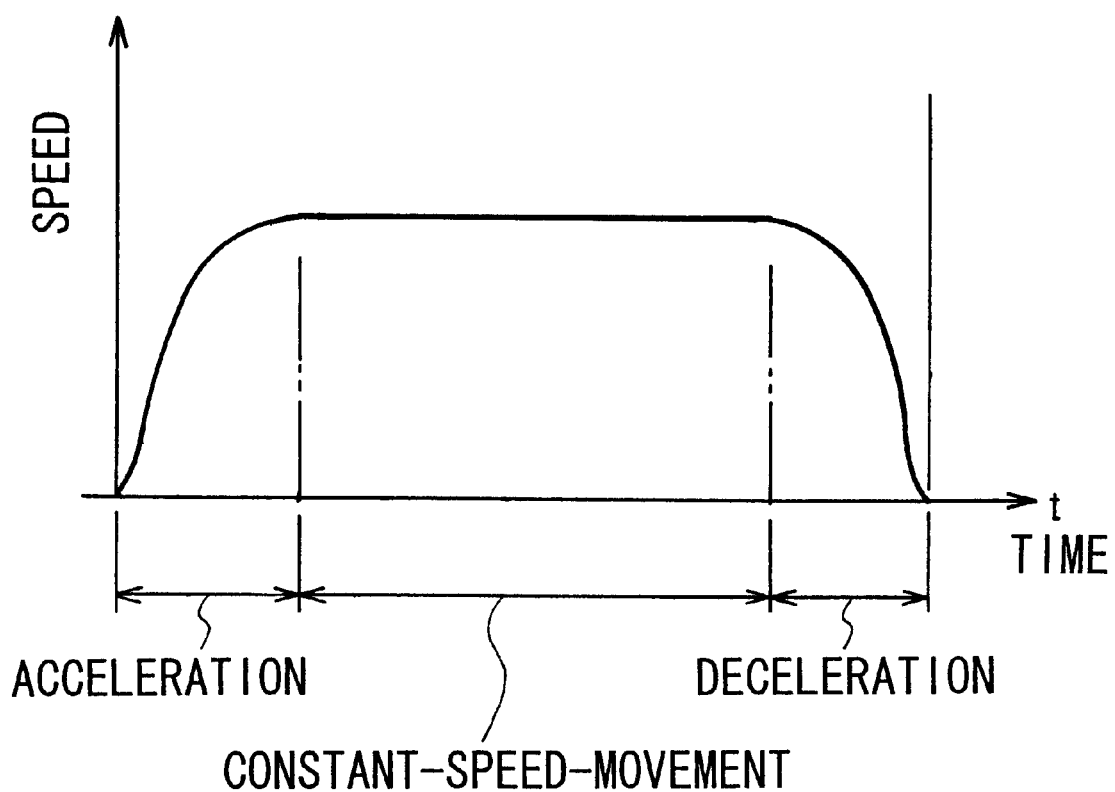

MOTOR CONTROLLING METHOD AND APPARATUS

BACKGROUND OF THE INVENTION

1. Field of the Invention

The present invention relates generally to a motor controlling method and an apparatus, and more particularly to controlling technology for a stepping motor applied to a panhead driving part of a camera or the like.

2. Description of Related Art

Conventionally, in case of a driving part using a stepping motor, operation curved lines of acceleration and deceleration showing the relationship between the movement amount of a panhead and the time are quadratic curves. An operation curved line showing the relationship between the speed and the time is shaped like a trapezoid as shown in FIG. 5 (Japanese Patent No. 2810934).

However, the panhead can not be moved at a high speed at the beginning of the operation since the torque of the stepping motor is low at the beginning. Also, in the conventional controlling method, the panhead can not be smoothly moved since the acceleration of the panhead is rapidly changed when the panhead is shifted from the acceleration to constant-speed-movement and from the constant-speed-movement to the deceleration.

SUMMARY OF INVENTION

It is therefore an object of the present invention to provide a stepping motor controlling method and apparatus in which a movable object can be smoothly shifted from acceleration to constant-speed-movement and from the constant-speed-movement to deceleration when the movable object is moved to a designated position in a designated time.

To achieve the above-described object, the present invention is directed to a motor controlling method for moving a movable object with a motor to a target position in a designated time, comprising the steps of: determining an acceleration period, a constant-speed-movement period and a deceleration period according to at least one of the target position and the designated time; applying exponential functions to operation equations of the acceleration and the deceleration showing relationships between movement amounts and a time; determining a constant speed during the constant-speed-movement and the exponential functions so that said movable object is smoothly shifted from the acceleration to the constant-speed-movement and from the constant-speed-movement to the deceleration; and driving said motor according to the determined exponential functions.

According to this invention, the exponential functions are applied to the operation equations of the acceleration and the constant-speed-movement, and the operation equations are determined so that the movable object is smoothly shifted from the acceleration to the constant-speed-movement and from the constant-speed-movement to the deceleration. Therefore, the movable object can be smoothly moved over the whole operation.

To achieve the above-described object, the present invention is directed to a motor controlling method, comprising the steps of: inputting a target position for a movable object; inputting a time for said movable object to arrive at the target position; determining an acceleration period, a constant-speed-movement period and a deceleration period according to one of the inputted target position and time; setting a constant-speed-movement start position at which the constant-speed-movement is started; setting a deceleration start position at which the deceleration is started; determining a constant speed during the constant-speed-movement according to the set constant-speed-movement start position and deceleration start position; applying an exponential function to an operation equation of the acceleration showing a relationship between a movement amount and a time and determining the operation equation so that the speed when said movable object is shifted from the acceleration to the constant-speed-movement is the same as the determined constant speed; applying an exponential function to an operation equation of the deceleration showing a relationship between a movement amount and a time and determining the operation equation so that the speed when said movable object is shifted from the constant-speed-movement to the deceleration is the same as the determined constant speed; and driving a motor to move said movable object to the target position according to the determined operation equation of the acceleration, constant speed during the constant-speed-movement and operation equation of the deceleration.

To achieve the above-described object, the present invention is directed to a motor controlling apparatus comprising: a target position inputting device that inputs a target position for a movable object; a time inputting device that inputs a time for said movable object to arrive at the target position; a period setting device that determines an acceleration period, a constant-speed-movement period and a deceleration period according to one of the inputted target position and time; a constant-speed-movement start position setting device that sets a constant-speed-movement start position at which the constant-speed-movement is started; a deceleration start position setting device that sets a deceleration start position at which the deceleration is started; a constant speed determining device that determines a constant speed during the constant-speed-movement according to the set constant-speed-movement start position and deceleration start position; an operation equation determining device that applies an exponential function to an operation equation of the acceleration showing a relationship between a movement amount and a time and determines the operation equation so that the speed when said movable object is shifted from the acceleration to the constant-speed-movement is the same as the determined constant speed, and applies an exponential function to an operation equation of the deceleration showing a relationship between a movement amount and a time and determines the operation equation so that the speed when said movable object is shifted from the constant-speed-movement to the deceleration is the same as the determined constant speed; and a control signal generating device that drives a motor to move said movable object to the target position according to the determined operation equation of the acceleration, constant speed during the constant-speed-movement and operation equation of the deceleration.

To achieve the above-described object, the present invention is directed to a recording medium that stores a program for executing the steps of, with a computer: designating a target position for a movable object and inputting a target position to said computer; designating a time for said movable object to arrive at the target position and inputting the time to said computer; determining an acceleration period, a constant-speed-movement period and a deceleration period according to one of the inputted target position and time and inputting the acceleration period, the constant-speed-movement period and the deceleration period to said computer; setting a constant-speed-movement start position at which the constant-speed-movement is started and inputting the constant-speed-movement start position to said computer; setting a deceleration start position at which the deceleration is started and inputting the deceleration start position to said computer; finding a constant speed during the constant-speed-movement according to the set constant-speed-movement start position and deceleration start position; and applying an exponential function to an operation equation of the acceleration showing a relationship between a movement amount and a time and calculating for determining the operation equation so that the speed when said movable object is shifted from the acceleration to the constant-speed-movement is the same as the determined constant speed, and applying an exponential function to an operation equation of the deceleration showing a relationship between a movement amount and a time and calculating for determining the operation equation so that the speed when said movable object is shifted from the constant-speed-movement to the deceleration is the same as the determined constant speed.

The recording medium may be a read only memory (ROM) loaded in the apparatus, and it may be an outer recording medium such as a floppy disc, a photo-magnetic disc and an IC memory card.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a block diagram of a panhead driving apparatus of an embodiment of the present invention;

FIG. 2 is a graph diagram showing an operation curved line of a stepping motor according to the present invention;

FIG. 3 is a diagram of an operation curved line showing the relationship between the speed and the time according to the present invention;

DETAILED DESCRIPTION OF THE PREFERRED EMBODIMENT

Figure 4:
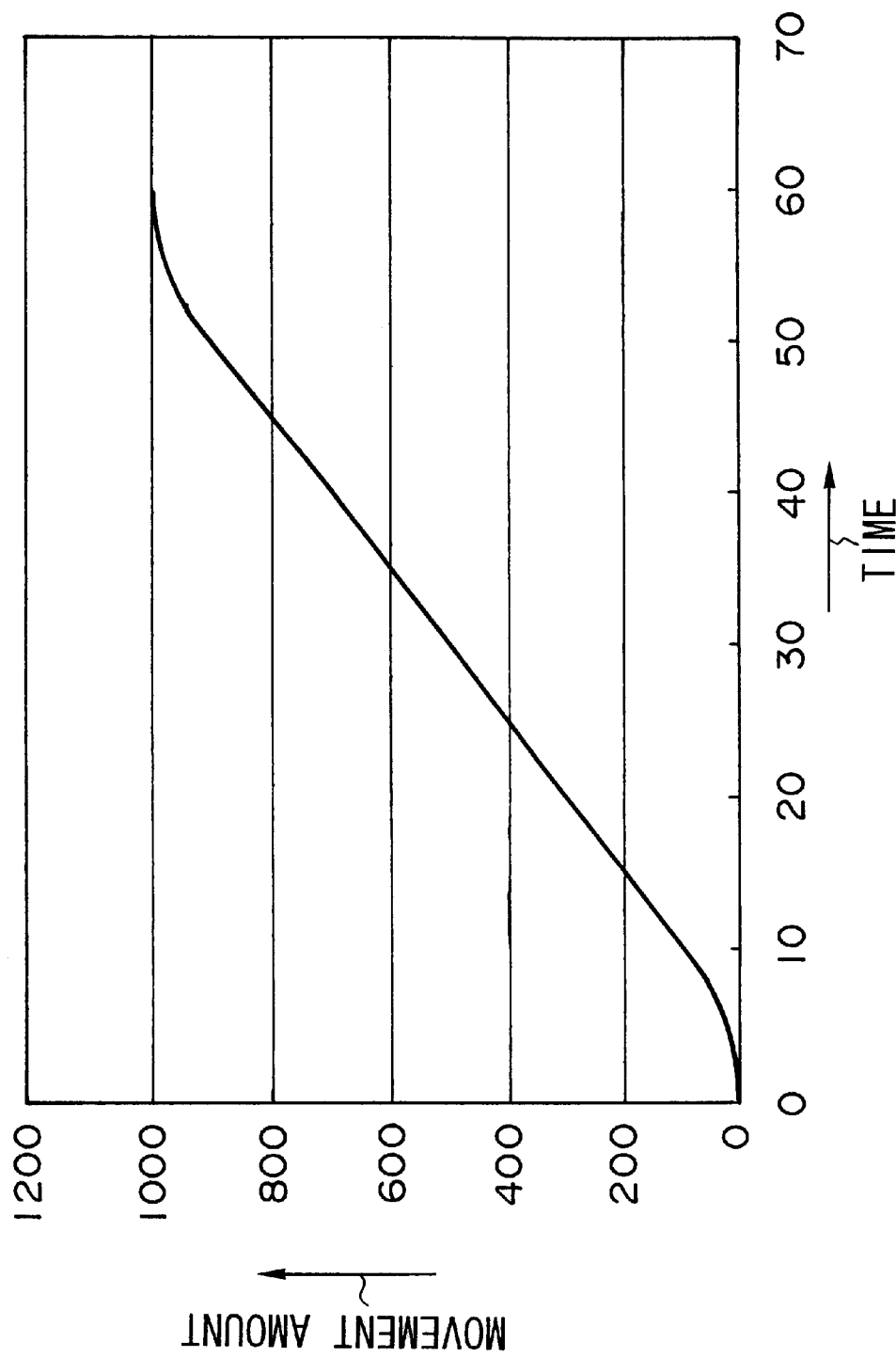
FIG. 4 is a diagram of an operation curved line of the stepping motor according to the present invention.

This invention will be described in further detail by way of example with reference to the accompanying drawings.

FIG. 1 is a block diagram of a panhead driving apparatus of an embodiment of the present invention. In FIG. 1, reference numeral 10 denotes a stepping motor (hereinafter referred to as a motor), and reference numeral 12 denotes an encoder (equivalent to a position determining device) that determines a rotation angle of the motor 10, and reference numeral 14 denotes a central processing unit (CPU) equivalent to a motor controlling part, and reference numeral 16 denotes a preset position selecting switch for designating a shooting position, and reference numeral 18 denotes a setting switch for adjusting control characteristics of the motor 10. A plurality of setting switches 18 may be provided, and the setting switch 18 may be a volume switch like a dial knob.

The motor 10 is a power source for driving a panning mechanism or a tilting mechanism of a panhead. The driving force of the motor 10 is transmitted to the panning mechanism or the tilting mechanism through a transmitting mechanism (not shown) including gears, and a camera (not shown) loaded on the panhead pans or tilts. The motor 10 is applied to a driving part for the panning mechanism in the following explanation, but it may be applied to a driving part for the tilting mechanism.

The motor 10 is driven according to driving signals given from the CPU 14. The encoder 12 determines rotation of the stepping motor 10, and the determination signal is inputted to the CPU 14. The CPU 14 finds the rotation amount of the motor 10, that is, the panning position (or the tilting position) of the panhead according to the determining signals received from the encoder 12.

The CPU 14 has a memory in which data (preset position data) showing at least one specific shooting position is stored. When the preset position selecting switch 16 is turned ON, the corresponding preset position data is read from the memory and the panhead is driven to turn the camera to the shooting position according to the data. The CPU 14 calculates operation equations of the stepping motor 10 according to the preset position data read from the memory, and outputs the driving signals (pulse signals) for driving the stepping motor 10 to turn the camera to the position the data shows as a target position.

The algorithm for determining acceleration and deceleration control pattern of the stepping motor 10 will now be explained with reference to FIG. 2.

[step 1] In FIG. 2, the origin O of the graph showing the relationship between movement amount and time corresponds to the movement origin, and the point P showing the target position and time corresponds to the movement destination.

[step 2] A switching time $t_1$ when the movement is switched from acceleration to constant-speed-movement and a switching time $t_2$ when the movement is switched from constant-speed-movement to deceleration are determined with respect to the time $T_0$ of the movement destination P. The switching times $t_1$ and $t_2$ are determined from percentages of the acceleration period and the deceleration period in the time $T_0$ (total time). For example, the percentages of the acceleration period and the deceleration period in the total time are 15%, and the percentage of the constant-speed-movement period is 70%. The percentages may be previously set, and they may be appropriately set by the user. The acceleration period and the deceleration period do not need to be the same, and they may be separately set.

[step 3] Then, a position (constant-speed-movement start position) A where the constant-speed-movement is started and a position (deceleration start position) B where the deceleration is started are set. The positions A and B are set in the following way. If the panhead were moved from the origin O to the destination P at a constant speed, the movement would be shown by the straight line OP (straight line ① in FIG. 2) connecting the origin O and the destination P.

The intersection of the straight line ① and the vertical line showing the switching time $t_1$ is A', and the position A at which the movement amount is 50% of the movement amount at the point A' is set as the constant-speed-movement start position.

Similarly, the intersection of the straight line ① and the vertical line showing the switching time $t_2$ is B', and the position B at which the remaining movement amount is 50% of the remaining movement amount at the point B' is set as the deceleration start position.

The ratio of the movement amount at the position A to that at the point A' and the ratio of the remaining movement amount at the position B to that at the point B' are not limited to 50%, and they may be previously set and the user may appropriately set them. The positions A and B may be separately set.

[step 4] Next, the constant speed during the constant-speed-movement period is found. The positions A and B are connected by a straight line in FIG. 2, and the inclination of the straight line AB (straight line ② in FIG. 2) is found.

[step 5] The operation equation of the acceleration period is found with an exponential function so that the speed at the switching time $t_1$ is the constant speed found at the step 4. Similarly, the operation equation of the deceleration period is found with an exponential function so that the speed at the switching time $t_2$ is the constant speed found at the step 4.

The operation equation of the acceleration period is the equation 1, $$y = y_1 \times \exp\{-k(t_1-t)/t_1\} - y_{c1}(1-t/t_1) \quad \text{equation 1}$$

where $y_1$ is the movement amount (movement amount at the constant-speed-movement start position) at the start of the constant-speed-movement, and $t_1$ is the time at the start of the constant-speed-movement, and $y_{c1}$ is a correction value.

The operation equation of the constant-speed-movement period is the equation 2, $$y = \{(y_2-y_1)/(t_2-t_1)\} \times t + y_1 \times \{(y_2-y_1)/(t_2-t_1)\} \times t_1; \text{ and} \quad \text{equation 2}$$

the operation equation of the deceleration period is the equation 3, $$y = (y_3-y_2) \times [1-\exp\{-k(t-t_2)/(t_3-t_2)\}] + y_{c2} \times (t-t_2)/(t_3-t_2), \quad \text{equation 3}$$

where $y_2$ is the movement amount (movement amount at the deceleration start position) at the start of the deceleration, and $t_2$ is the time at the start of the deceleration, and $y_{c2}$ is a correction value, and $y_3$ is the movement amount at the target position, and $t_3$ is the designated time for the panhead to arrive at the target position.

The operation equation of the acceleration period is determined in such a way that the equation 1 is differentiated and the coefficient k is found so that the speed at the time $t_1$ is the same as the constant speed of $(y_2-y_1)/(t_2-t_1)$, $$k = (y_2-y_1)/(t_2-t_1) \times t_1/y_1. \quad \text{equation 4}$$

In like manner, the operation equation of the deceleration period is determined in such a way that the equation 3 is differentiated and the coefficient k is found so that the speed at the time $t_2$ is the same as the constant speed.

The operation curved line OABP from the origin O to the destination P is found in this way. Each time the motor is instructed to drive the panhead, an operation curved line like this is produced to control the motor. The calculation is performed within 10 milliseconds.

Figure 5:
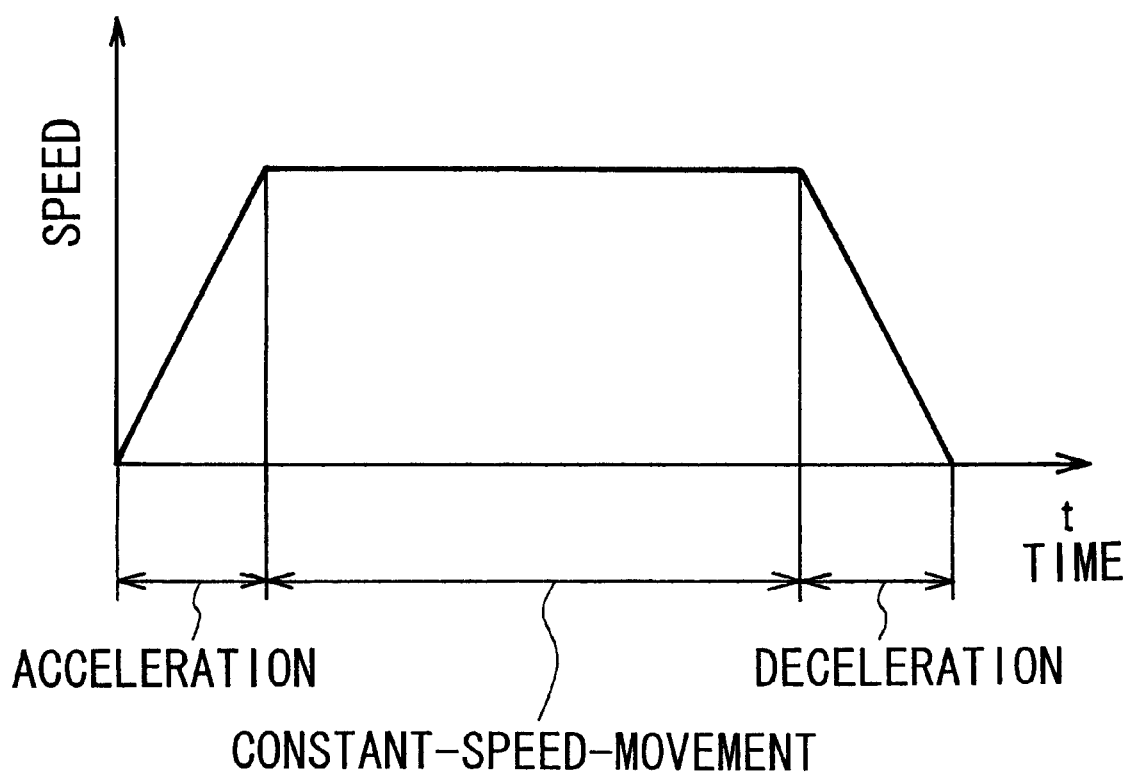
FIG. 5 is a diagram showing a conventional method of controlling the stepping motor.

FIG. 3 is an operation curved line showing the relationship between the speed and the time according to the present invention. It is clear that, compared with the panhead in the conventional method in FIG. 5, the panhead is smoothly shifted from the acceleration to the constant-speed-movement and from the constant-speed-movement to the deceleration in the present invention since the operation equations of the acceleration period and the deceleration period have the exponential functions. Therefore, the panhead is smoothly moved over the whole operation.

FIG. 4 is an operation curved line of the stepping motor according to the present invention. In FIG. 4, the abscissa represents the time, and its unit is 10 milliseconds. For example, "60" represents the time at the destination means 0.6 second. The ordinate represents the number of pulses corresponding to the movement amount.

The present invention is applied to the panhead driving apparatus in the embodiment, but the present invention is not applied to this, and it may be applied to various driving apparatuses using stepping motors.

Also, a computer program for finding operation equations of the motor according to the algorithm explained in FIG. 2 may be provided as software. In case the software is installed in a computer, operation curved lines of the motor can be simulated while parameters such as the switching times, the constant-speed-movement start position and the deceleration start position are changed.

As set forth hereinabove, the operation equations of the acceleration period and the deceleration period have the exponential functions, and the operation equations are determined so that the panhead is smoothly shifted from the acceleration to the constant-speed-movement and from the constant-speed-movement to the deceleration. Therefore, the panhead is smoothly moved over the whole operation.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A motor controlling method, comprising the steps of:
   inputting a target position for a movable object;
   inputting a time for said movable object to arrive at the target position;
   determining an acceleration period, a constant-speed-movement period and a deceleration period according to one of the inputted target position and time;
   setting a constant-speed-movement start position at which the constant-speed-movement is started;
   setting a deceleration start position at which the deceleration is started;
   determining a constant speed during the constant-speed-movement according to the set constant-speed-movement start position and deceleration start position;
   applying an exponential function to an operation equation of the acceleration showing, a relationship between a movement amount and a time and determining the operation equation so that the speed when said movable object is shifted from the acceleration to the constant-speed-movement is the same as the determined constant speed;
   applying an exponential function to an operation equation of the deceleration showing a relationship between a movement amount and a time and determining the operation equation so that the speed when said movable object is shifted from the constant-speed-movement to the deceleration is the same as the determined constant speed; and
   driving a motor to move said movable object to the target position according to the determined operation equation of the acceleration, constant speed during the constant-speed-movement and operation equation of the deceleration.

2. A motor controlling apparatus comprising:
- a target position inputting device that inputs a target position for a movable object;
- a time inputting device that inputs a time for said movable object to arrive at the target position;
- a period setting device that determines an acceleration period, a constant-speed-movement period and a deceleration period according to one of the inputted target position and time;
- a constant-speed-movement start position setting device that sets a constant-speed-movement start position at which the constant-speed-movement is started;
- a deceleration start position setting device that sets a deceleration start position at which the deceleration is started;
- a constant speed determining device that determines a constant speed during the constant-speed-movement according to the set constant-speed-movement start position and deceleration start position;
- an operation equation determining device that applies an exponential function to an operation equation of the acceleration showing a relationship between a movement amount and a time and determines the operation equation so that the speed when said movable object is shifted from the acceleration to the constant-speed-movement is the same as the determined constant speed, and applies an exponential function to an operation equation of the deceleration showing a relationship between a movement amount and a time and determines the operation equation so that the speed when said movable object is shifted from the constant-speed-movement to the deceleration is the same as the determined constant speed; and
- a control signal generating device that drives a motor to move said movable object to the target position according to the determined operation equation of the acceleration, constant speed during the constant-speed-movement and operation equation of the deceleration.

3. A recording medium that stores a program for executing the steps of, with a computer:
- designating a target position for a movable object and inputting a target position to said computer;
- designating a time for said movable object to arrive at the target position and inputting the time to said computer;
- determining an acceleration period, a constant-speed-movement period and a deceleration period according to one of the inputted target position and time and inputting the acceleration period, the constant-speed-movement period and the deceleration period to said computer;
- setting a constant-speed-movement start position at which the constant-speed-movement is started and inputting the constant-speed-movement start position to said computer;
- setting a deceleration start position at which the deceleration is started and inputting the deceleration start position to said computer;
- finding a constant speed during the constant-speed-movement according to the set constant-speed-movement start position and deceleration start position; and
- applying an exponential function to an operation equation of the acceleration showing a relationship between a movement amount and a time and calculating for determining the operation equation so that the speed when said movable object is shifted from the acceleration to the constant-speed-movement is the same as the determined constant speed, and applying an exponential function to an operation equation of the deceleration showing a relationship between a movement amount and a time and calculating for determining the operation equation so that the speed when said movable object is shifted from the constant-speed-movement to the deceleration is the same as the determined constant speed.

* * * * *